Nov. 10, 1942.   W. L. POLLARD   2,301,451
VARIABLE SPEED TRANSMISSION
Filed Dec. 13, 1940   4 Sheets-Sheet 1

Patented Nov. 10, 1942

2,301,451

UNITED STATES PATENT OFFICE 2,301,451

VARIABLE SPEED TRANSMISSION

Willard L. Pollard, Evanston, Ill.

Application December 13, 1940, Serial No. 370,045

15 Claims. (Cl. 74—189.5)

My invention relates to variable speed transmissions.

One of the objects of my invention is to provide an improved hydraulic torque converter transmission with improved means whereby under one condition power may be transmitted from a drive shaft to a driven shaft along two parallel paths, one of which includes the hydraulic torque converter, and whereby under another condition all of the power may be transmitted through the hydraulic torque converter.

A further object of my invention is to provide such a construction in which an overdrive may be obtained.

A further object is to provide a premature transformation efficiency booster for transforming the hydraulic part of the transmission from torque converter action to coupling action at a high point on the efficiency curve.

A further object is to provide an improved ever ready by-pass efficiency booster in which means are always available for instantaneously throwing in and out the by-pass power flow around the hydraulic part of the transmission.

A further object is to provide an ever ready shift in a plural stage hydro planetary transmission.

Further objects and advantages of the invention will be apparent from the description and claims.

In the drawings, in which several forms of my invention are shown.

Figures 1, 2, 3, 4, 5, 6, 10:
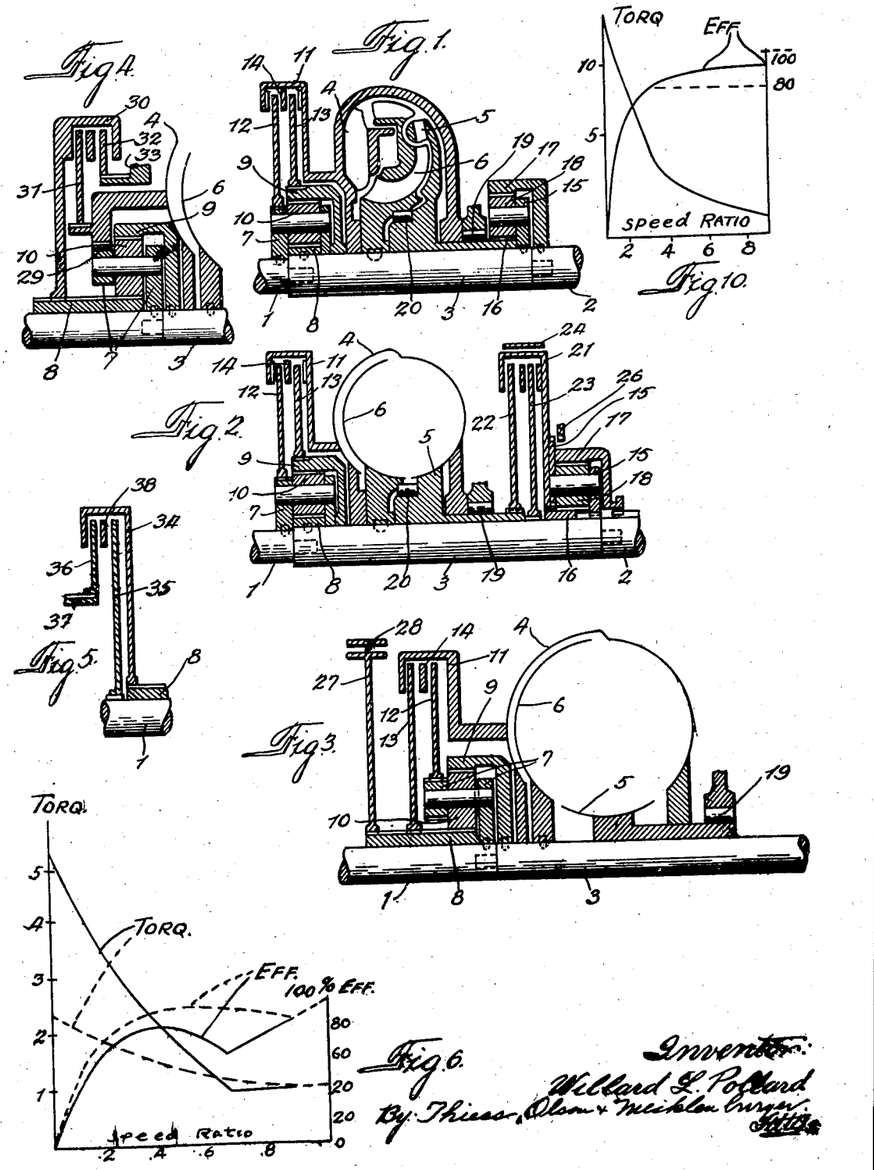
Figure 1 is an axial section showing a combination hydraulic torque converter and planetary gear drive.
Fig. 2 is an axial section showing another form.
Fig. 3 is an axial section showing another form.
Fig. 4 is an axial section showing a control apparatus which may be substituted for part of the control apparatus of Fig. 3.
Fig. 5 is an axial sectional view showing another control apparatus which may be substituted for part of the control apparatus shown in Fig. 3.
Fig. 6 is a chart of efficiency, torque, and speed curves.
Fig. 10 is a chart showing efficiency and torque curves plotted against relative speeds.

Referring to the drawings in detail, and first to Fig. 1, the construction shown comprises a drive shaft 1, a driven shaft 2, an intermediate shaft 3, a hydraulic torque converter comprising a pump rotor 4, a one-way rotatable stator 5, a turbine rotor 6 keyed to the intermediate shaft, a front planetary comprising a planet carrier 7 keyed to the drive shaft 1, a sun gear 8 keyed to the intermediate shaft 3, a ring gear 9, planet gearing 10 carried by the gear carrier 7 and meshing with the sun gear 8 and ring gear 9, a dual clutch comprising a casing 11 rotatable with the pump rotor 4, a clutch disc 12 splined on the gear carrier 7, a clutch disc 13 splined on the ring gear 9, clutch means 14 whereby either one of the clutch discs may be connected to rotate with the casing 11 and pump rotor 4, and a rear planetary construction comprising a gear carrier 15 keyed to the intermediate shaft 3, a sun gear 16 rotatable with the one-way stator 5, a ring gear 17 keyed to the driven shaft 2, planet gearing 18 carried by the gear carrier 15 and meshing with the sun gear 16 and ring gear 17, a one-way anchorage device 19 for preventing reverse rotation of the one-way stator 5, and a one-way clutch 20 for preventing the one-way stator from overrunning the turbine rotor.

In this construction, if the dual clutch is set to connect the pump rotor 4 with the gear carrier 7, the entire power flow will pass through the hydraulic torque converter to the intermediate shaft 3, giving a relatively high torque ratio. The torque from the intermediate shaft 3 will be transmitted through the gear carrier 15 to the planetary gearing 18. This will cause force to be exerted in the direction of rotation of the intermediate shaft 3, both on the sun gear 16 and on the ring gear 18. This will cause rotation of the driven shaft. When the torque ratio becomes such that the torque exerted on the sun gear 16 by the planet gear becomes greater than the reverse torque exerted on the one-way stator 5 by the fluid action, the one-way stator will begin to rotate and the hydraulic part of the transmission will cease to act as a converter and will then act as a coupler. This eliminates a drop in the efficiency curve, as explained in my co-pending application Serial No. 308,668, filed December 11, 1939.

If the dual clutch is operated to disconnect the pump rotor 4 from the gear carrier 7 and connect it with the ring gear 9, the power flow from the drive shaft 1 to the intermediate shaft 3 will be divided into two paths. One path will be from the ring gear 9 through the pump rotor 4, stator 5 and turbine rotor 6 to the intermediate shaft 3. The other path will be from the planet gearing 10 through the sun gear 8 to the intermediate shaft. This will result in an increase in the overall efficiency between the drive shaft and the intermediate shaft as a large proportion of the power is by-passed around the torque converter.

The construction shown in Fig. 2 is similar to that shown in Fig. 1 except that a dual twin disc clutch is provided for eliminating the premature transformation action and giving a higher final torque ratio, that a brake is provided for giving an overdrive, and a shift is provided for enabling a reverse to be obtained. In the twin disc clutch construction, the clutch casing 21 is rotatable with the sun gear 16 and can be alternatively connected, either with the one-way stator 5 or with the intermediate shaft 3, by means of the clutch discs 22 and 23. When the clutch casing 21 is connected with the clutch disc 23, the sun gear 16 is secured to rotate with the intermediate shaft 3 and as the gear carrier 15 also is secured to rotate with the intermediate shaft, the planetary construction will rotate as a unit, so that the shaft 2 will be driven at the same speed as the shaft 3.

For overdrive, the clutch discs 22 and 23 are both freed and a brake 24 is applied to the clutch casing 21 to hold the sun gear 16 against rotation to effect an overdrive of the ring gear 17 slidably keyed to the final driven shaft 2.

For reverse, the entire planetary construction can be shifted bodily rearwardly to connect the gear carrier 15 with the stationary dog clutch ring 26 and to free the gear carrier from the intermediate shaft 3. The twin disc clutch will be positioned to connect the clutch casing 21 with the clutch disc 23 so that the sun gear 16 will rotate with the shaft 3. Under these conditions, the gear carrier 15 is held against rotation, the sun gear 16 rotates with the shaft 3, and the ring gear 17 and final driven shaft 2 rotate in a reverse direction and at a lower speed than the intermediate shaft 3.

In the construction shown in Fig. 3, the drive shaft 1, the pump rotor 4, the stator 5, the turbine rotor 6, the gear carrier 7, the sun gear 8, the ring gear 9, the clutch casing 11, the clutch discs 12 and 13, and the one-way anchor 19 may be similar to those previously described. In Fig. 3, however, the clutch disc 13 is splined on the sun gear 8 instead of on the ring gear 9, as shown in Figs. 1 and 2, and in Fig. 3 the shaft 3 is keyed to the ring gear 9 instead of to the sun gear 8, as shown in Figs. 1 and 2. In addition, a brake drum 27 is secured to the sun gear 8 so that when desired the sun gear 8 may be held against rotation by application of the brake shoe 28 to the brake drum 27. With this construction three different driving conditions may be obtained. If the member 14 is applied to connect the clutch plate 12 with the clutch casing 11, the entire power flow will be from the gear carrier 7, through the clutch plate 12, clutch casing 11, pump rotor 4, stator 5 and turbine rotor 6 to the shaft 3. If the member 14 is operated to connect the clutch plate 13 with the clutch housing 11, there will be a divided power flow between the shafts 1 and 3, one path being from the gear carrier 7 through the planet gearing 10 and ring gear 9 to the shaft 3, the other path being from the gear carrier 7 to the planet gearing 10, sun gear 8, clutch plate 13, clutch housing 11, pump rotor 4, stator 5, and turbine rotor 6 to the shaft 3. Under this condition, the ring gear 9 acts as an efficiency booster in by-passing a large proportion of the power around the hydraulic transmission.

For overdrive, both clutch plates 12 and 13 are disconnected and the brake shoe 28 is applied to hold the sun gear 8 against rotation. Under these conditions the hydraulic action is entirely eliminated, the entire power flow being from the gear carrier 7, through planet gearing 10 and ring gear 9 to the driven shaft 3.

The construction shown in Fig. 4 is similar to that shown in Fig. 3 except that in Fig. 4 a one-way clutch connection 29 is provided between the gear carrier 7 and the pump rotor 4, and clutch means are provided which, in one condition, connect the sun gear 8 to rotate with the pump rotor 4 and, in another condition, hold the sun gear 8 against rotation. The clutch means shown for this purpose comprise a clutch casing 30 keyed to the sun gear 8, a clutch disc 31, splined to the casing of the pump rotor 4, and an anchor disc 32 splined to a nonrotatable anchorage member 33.

In this construction also there are three different power flow conditions similar to those of the construction of Fig. 3. When both of the discs 31 and 32 are free, the entire power flow is from the gear carrier 7, through the one-way clutch, pump rotor casing, pump rotor 4, stator 5, and turbine rotor 6 to the turbine shaft 3. Under the condition in which the clutch plate 31 is connected to cause the pump rotor 4 to rotate with the sun gear 8, the power flow is divided, one path being from the gear carrier 7, through the ring gear 9 to the driven shaft 3, and the other path being from the gear carrier 7 through the planet gearing 10, sun gear 8, clutch casing 30, clutch disc 31, pump rotor 4, stator 5, and turbine rotor 6 to the driven shaft 3.

For overdrive, the clutch disc 31 is released, and the friction disc 32 is placed in condition to hold the sun gear 8 against rotation. Under this condition, the hydraulic action will be eliminated and an overdrive will be effected from the gear carrier 7 through the planetary 10 and ring gear 9 to the driven shaft 3.

In Fig. 5 is shown a construction which may be substituted for the brake drum 27 and brake shoe 28 shown in Fig. 3. This construction comprises a clutch housing 34 keyed to the sun gear 8, a clutch disc 35 splined to the drive shaft 1, an anchorage plate 36 splined to a nonrotatable anchorage member 37, and a disc controller 38 by means of which the clutch casing 34 may be connected, either to the clutch disc 35 or to the anchorage disc 36. With this construction, in addition to the three conditions outlined with respect to the construction of Fig. 3, another condition is possible, in that the sun gear 8 can be secured to rotate with the drive shaft 1, thus effecting a direct drive with the hydraulic action eliminated.

Fig. 6 shows a comparison of the curves obtainable with the construction of Figs. 3, 4, and 5 as compared with the efficiency and torque curves obtainable by the use of the torque converter alone. The curves obtainable by the torque converter alone are shown in full lines and the efficiency and torque curves obtainable by the turboplanetary combinations shown are indicated in dotted lines.

Figure 7:
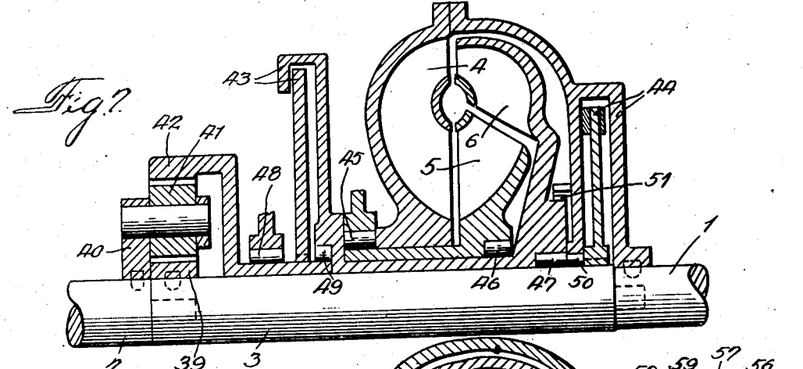
Figs. 7, 8 and 9 are axial sectional views of other forms of my invention.

The construction shown in Fig. 7 comprises a drive shaft 1, a driven shaft 2, an intermediate shaft 3, a pump rotor 4 keyed to the drive shaft 1, a one-way rotatable stator 5, a turbine rotor 6 driven from the pump rotor 4, a sun gear 39 keyed to the intermediate shaft 3, a gear carrier 40 keyed to the driven shaft, planet gearing 41 mounted on the gear carrier 40 and meshing with the sun gear 39, a ring gear 42 meshing with the planet gearing, clutch means 43 for connecting and disconnecting the ring gear 42 with respect to the turbine rotor 6, clutch means 44 for connecting and disconnecting the intermediate shaft 3 with respect to the drive shaft 1, one-way anchorage means 45 for holding the stator 5 against reverse rotation, a one-way clutch 46 for preventing the stator 5 from overrunning the turbine rotor 6, a one-way clutch 47 for preventing the turbine rotor 6 from overrunning the intermediate shaft 3, a one-way anchorage device 48 to prevent the reverse rotation of the ring gear, a one-way clutch 49 to prevent the ring gear 42 from overrunning the turbine rotor 6, a one-way clutch 50 to prevent the intermediate shaft 3 from overrunning the drive shaft 1, and a centrifugal clutch 51 which enables the turbine rotor 6 to be connected directly with the pump rotor 4 when a certain speed of the turbine rotor is obtained. This construction may be suitable for a truck drive where very high torque is occasionally required. The two clutches 43 and 44 may be operated to provide three different driving conditions. For extremely high torque, the clutch 43 is disconnected to allow the ring gear 42 to rest against the one-way anchor 48 and the clutch 44 is placed in position to free the intermediate shaft 3 from the drive shaft 1. Under these conditions, the ring gear 42 is held against reverse rotation and the entire power flow is from the drive shaft 1 through the pump rotor 4, stator 5, turbine rotor 6, one-way clutch 47, intermediate shaft 3, sun gear 39, planet gearing 41, and gear carrier 40 to the driven shaft 2. If the torque converter gives a torque multiplication of 4:1 and the planet gearing gives a torque multiplication of 3:1, the overall torque increase will be in the ratio of 12:1.

For another driving condition, the clutch 43 is operated to connect the ring gear 42 to rotate with the turbine rotor 6, the clutch 44 being still disconnected. Under these conditions, both the ring gear 42 and the sun gear 39 will be in driven relation with respect to the turbine rotor 6. The power flow from the turbine rotor 6 to the ring gear 42 will be through the clutch 43, and the power flow from the turbine rotor to the sun gear 39 will be through the one-way clutch 47 and shaft 3. Since both the sun gear and ring gear are caused to rotate with the turbine rotor, the ultimate effect is that the gear carrier 40 also rotates with the turbine rotor. If the hydraulic transmission has a torque ratio of 4:1, this will give a torque ratio of 4:1 between the drive shaft 1 and the driven shaft 2. Under this condition, the sun gear 9 acts as an efficiency booster, as it by-passes a substantial portion of the power around the hydraulic transmission.

Under the third condition the clutch 43 is placed in position to connect the ring gear 42 to rotate with the turbine 6 and the clutch 44 is placed in position to connect the intermediate shaft 3 to rotate with the drive shaft 1. This will give a lower torque ratio than that outlined with the second condition, but will result in an increase in efficiency as only a portion of the power flow is through the moderately efficient hydraulic transmission, the other portion of the power flow being through a more highly efficient path.

The flow from the drive shaft 1 to the driven shaft 2 through the hydraulic transmission is from the pump rotor 4 through the stator 5, turbine rotor 6, clutch 43, ring gear 42, planet gearing 41, and gear carrier 40. The other path is from the drive shaft 1 through the clutch plate 44, intermediate shaft 3, sun gear 39, planet gearing 41, and gear carrier 40 to the driven shaft.

Figure 8:
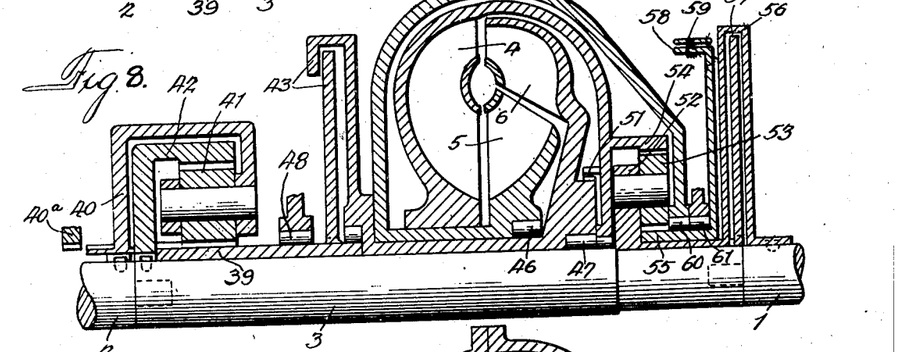

The construction shown in Fig. 8 is similar to that shown in Fig. 7, except that the relations of the sun gear and ring gear are reversed, and that a premature transformation efficiency booster is provided in combination with the hydraulic transmission. In Fig. 8 the clutch disc 43 is splined to the sun gear 39 instead of to the ring gear 42, as in Fig. 7, and the intermediate shaft 3 is keyed to the ring gear 42 rather than to the sun gear as shown in Fig. 7.

The premature transformation efficiency booster construction shown comprises a gear carrier 52 rotatable with the drive shaft 1, planet gearing 53 mounted on the gear carrier 52, a ring gear 54 meshing with the planet gearing 53 and rotatable with the pump rotor 4, a sun gear 55 meshing with the planet gearing 53, a clutch casing 56, a clutch plate 57 for connecting and disconnecting the intermediate shaft 3 with respect to the drive shaft 1, and a brake drum 58 and brake shoe 59 for holding the sun gear 55 against rotation to effect overdrive. As indicated above, the gear carrier 52 is always rotated with the drive shaft 1 through the clutch casing 56. A one-way clutch 60 is provided to prevent the sun gear 55 from overrunning the stator 5 and a one-way anchor 61 is provided to prevent reverse rotation of the sun gear 55, thus also holding the one-way stator 5 against reverse rotation through the action of the one-way clutch 60.

A premature transformation of the hydraulic transmission from torque conversion action to coupling action results because of the fact that as soon as the torque, due to the pressure of the planet gearing 53 on the sun gear 55 becomes greater than the reverse torque acting on the one-way stator 5, the one-way stator 5 will begin to rotate and thereafter the hydraulic transmission will act as a coupler rather than as a converter.

The clutch construction 56 and 57 of Fig. 8 accomplishes a result similar to that accomplished by the clutch 44 of Fig. 7 in that it connects the intermediate shaft 3 to rotate directly with the drive shaft 1, thus by-passing a large proportion of the power through the ring gear 42, planet gearing 41, and gear carrier 40 to the driven shaft 2. For overdrive the clutch plate 57 is released and the brake shoe 59 is applied to hold the sun gear 55 against rotation to effect overdrive of the ring gear 54. This overdrive may be used either with the clutch 43 connecting the sun gear 39 to rotate with the turbo-rotor 6, or with the clutch 43 released to enable the sun gear to rest back on the one-way anchor 48.

In general, the effect is that the maximum torque obtainable from the construction of Fig. 8 is less than the maximum torque obtainable with that of Fig. 7 on the one hand, but that the efficiency when the divided power flow paths are used is higher than in that of Fig. 7, since a smaller proportion of the power is caused to flow through the moderately efficient hydraulic transmission in the construction of Fig. 8 than in the construction of Fig. 7.

Figure 9:
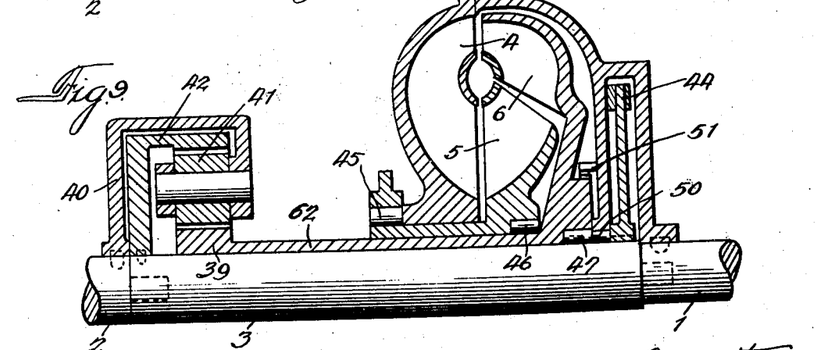

The construction shown in Fig. 9 is similar to that shown in Figs. 7 and 8, except that here the clutch connection between the turbine 6 and one of the gears of the planetary transmission is omitted, the sun gear 39 being connected to rotate with the turbine rotor 6 by means of the tubular shaft 62. In the construction of Fig. 9 only two driving conditions are obtainable. In one condition, for maximum torque, the clutch 44 is operated to free the intermediate shaft 3 from the drive shaft 1. Under this condition, both the sun gear 39 and the ring gear 42 are connected in driven relation with respect to the turbine rotor 6, the ring gear 42 being driven from the turbine rotor 6 through the one-way clutch 47 and intermediate shaft 3, and the sun gear 39 as previously described being always rotatable with the turbine rotor 6.

For a lower torque, higher efficiency condition, the clutch 44 is operated to connect the intermediate shaft 3 with the drive shaft 1. Under these conditions, the intermediate shaft 3 will travel ahead of the turbine rotor 6 so that the sun gear 39 only will be driven from the turbine rotor. This will give an efficient drive, as the major portion of the power flow is by-passed around the hydraulic transmission.

In Fig. 8 the gear carrier 40 and ring gear 42 may be slidably splined on the shafts 2 and 3, respectively, and a stationary gripping ring 40a may be provided for coöperation with a corresponding gripping ring on the gear carrier 40. With this construction, for reverse, the gear carrier 40 and ring gear 42 may be shifted rearwardly to disconnect the gear carrier 40 from the driven shaft 2 and connect it with the fixed gripping ring 40a and to disconnect the ring gear from its splined connection with the shaft 3 and connect it with the driven shaft 2. Under these conditions, the gear carrier is held against rotation, the sun gear is connected to rotate with the turbine rotor 5 and the ring gear 42 will be driven in a reverse direction, carrying with it the driven shaft 2.

In the construction of Fig. 9, if desired, the rear end planetary of Fig. 8 may be substituted so that the construction of Fig. 9 also will be provided with a reverse drive for the driven shaft 2.

In the construction of Figs. 8 and 9, if desired, the rear end planetary gear of Fig. 7 may be substituted for the rear end planetary gear shown so that the ring gear 42 will be connectible and disconnectible with respect to the turbine rotor 6, and the sun gear 39 will be keyed to the intermediate shaft 3.

The chart in Fig. 10 shows approximately the torque and efficiency curves which may be obtained from the construction shown in Fig. 7, based on the normal efficiency and torque curves of the torque converter working alone. In the curves shown, it is assumed that the clutch 44 will be disconnected during approximately the lower third of the speed ratio range, giving a torque curve which drops from approximately 12 to approximately 4 and an efficiency curve starting at zero and rising to above 80 per cent. For the upper two-thirds of the speed ratio range, it is assumed that the clutch disc 44 is in position to connect the intermediate shaft 3 to rotate with the drive shaft 1 for by-pass power flow, giving an efficiency curve which will not vary greatly from 90 per cent and a torque curve which will drop from approximately 4 to 1.

Figure 11:
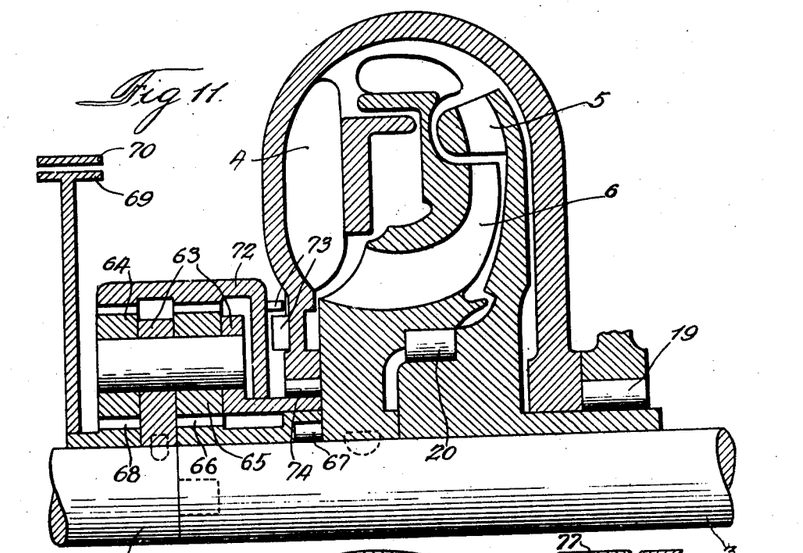
Figs. 11, 12, 13, 14, 15 and 16 are axial sectional views of other forms of my invention.

In Fig. 11 is shown a construction similar in some respects to the construction shown in Fig. 1, in which the by-pass power flow is through the sun gear but providing for an overdrive. In this construction, the parts 1, 3, 4, 5, 6, 19, and 20 may be similar to those shown in Fig. 1. The planetary part of the transmission comprises a gear carrier 63 keyed to the drive shaft 1, two sets of planet gears 64 and 65 mounted on this gear carrier 63, a sun gear 66 meshing with the planet gears 65, a one-way clutch 67 for preventing the sun gear 66 from overrunning the turbine shaft 3, a sun gear 68 meshing with the planet gears 64, a brake drum 69 and brake shoe 70 for holding the sun gear 68 against rotation for overdrive of the ring gear 72 which meshes with both sets of planet gears 64 and 65, a centrifugal clutch 73 by means of which connection may be effected between the ring gear 72 and the pump rotor 4, and a one-way clutch 74 for preventing the gear carrier from overrunning the pump rotor.

With this construction, there are three possible driving conditions: (1) the brake drum 69 may be free to rotate and the centrifugal clutch 73 may be disconnected; (2) the brake drum 69 may be free and the centrifugal clutch 73 connected; and (3) the brake drum 69 may be held against rotation and the centrifugal clutch 73 still connected.

Under the first condition, the drive will be from the gear carrier 63 through the one-way clutch 74, pump rotor 4, stator 5, and turbine rotor 6 to the shaft 3. Under the second condition, there will be a divided power flow between shafts 1 and 3, one path being from the gear carrier 63 through the planet gears 65, sun gear 66, and one-way clutch 67 to the shaft 3, and the other path being from the gear carrier 63 through the planet gears 65, ring gear 92, centrifugal clutch 73, pump rotor 4, stator 5, and turbine 6 to the shaft 3. Under the third condition, the flow will be from the gear carrier 63 through the planet gears 65, ring gear 72, centrifugal clutch 73, pump rotor 4, stator 5, and turbine rotor 6 to the shaft 3, the one-way stator 5 revolving with the pump rotor 4 and turbine rotor 6, and the ring gear 72 being overdriven with respect to the gear carrier 63 by reason of the fact that the sun gear 68 is held against rotation.

Figure 12:
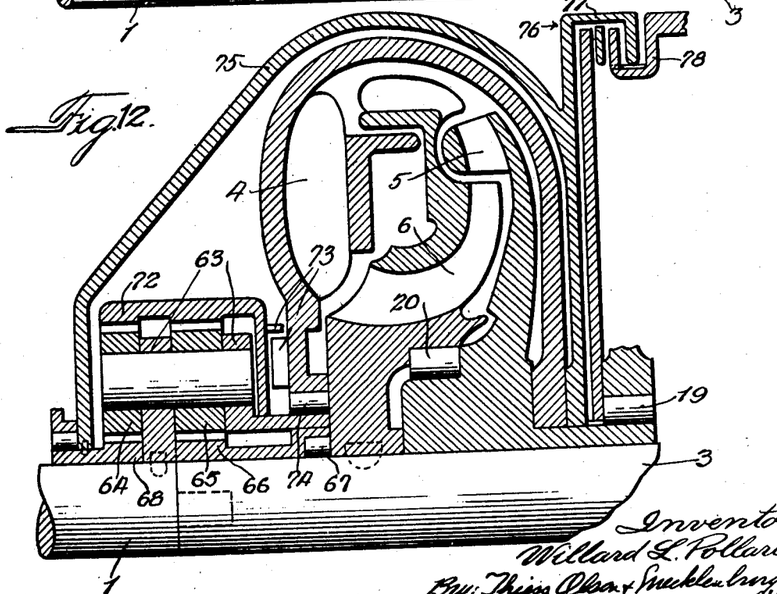

In Fig. 12, the hydro planetary construction is similar to that shown in Fig. 11, the parts 1, 3, 4, 5, 6, 19, 20, 63, 64, 65, 66, 67, 68, 72, 73, and 74 corresponding to similarly numbered parts of Fig. 11. In Fig. 12, however, provision is made for premature transformation of the hydraulic transmission from torque conversion action to coupling action.

In Fig. 12, provision is made for connecting and disconnecting the sun gear with respect to the one-way stator 5, as well as for holding the sun gear against rotation when desired for overdrive. For this purpose, a power-transmitting housing 75 is provided, keyed to the sun gear 68 and also a dual clutch and brake 76 whereby, in one condition of the dual clutch and brake, the clutch housing 77, and hence the sun gear 68, may be held against rotation by the anchor ring 78 and, in another condition, the housing 77 may be connected with the clutch plate 79 splined to the hub of the one-way stator. This construction is operable under four different conditions: (1) the clutch casing 77 may be left free to rotate and the centrifugal clutch 73 may be disconnected; (2) the clutch casing 77 may be left free to rotate and the centrifugal clutch 73 may be connected; (3) the clutch may be operated to connect the sun gear 68 with the hub of the one-way stator 5 with the centrifugal clutch 73 still connected; and (4) the clutch may be operated to hold the sun gear 68 against rotation with the centrifugal clutch 73 still connected.

Under the first condition, the power flow will be from the gear carrier 63 through the one-way clutch 74, pump rotor 4, stator 5, and turbine 6 to the shaft 3. Under the second condition, there will be a divided power flow, one path being from the gear carrier 63 through the planet gears 65, a sun gear 66, and one-way clutch 67 to the shaft 3, and the other path being from the gear carrier 63 through the planet gears 65, ring gear 72, centrifugal clutch 73, pump rotor 4, stator 5, and turbine rotor 6 to the shaft 3. Under the third condition, the sun gear 68 will be connected to the one-way stator 5 to effect a premature transformation. Under these conditions, as soon as the forward torque on the sun gear 68 overcomes the reverse torque on the one-way stator 5, the one-way stator 5 will start to rotate, eliminating the torque conversion action and transforming it to coupler action. Under the fourth condition, the power flow will be from the gear carrier 63, through the planet gears 65, ring gear 72, centrifugal clutch 73, pump rotor 4, stator 5, and turbine rotor 6 to the shaft 3, the sun gear 68 being held against rotation to effect overdrive of the ring gear 72 with respect to the gear carrier.

In the construction shown in Figs. 13, 14, 15, and 16, the parts 1, 2, 3, 4, 5, 6, 39, 40, 40a, 41, 42, 46, 47, and 49 are similar in structure and function to the corresponding parts shown in Figs. 7, 8, and 9. In Figs. 13–16, incl., however, means are provided for dividing the power flow in two different places. In one place, power flow is divided so that one part flows to the pump rotor and another part to the turbine rotor. In another place, the power flow is divided so that one branch of the power flows to one of the gears of the rear planetary, by-passing the fluid torque converter, and the other part flows to the fluid torque converter.

Figure 13:
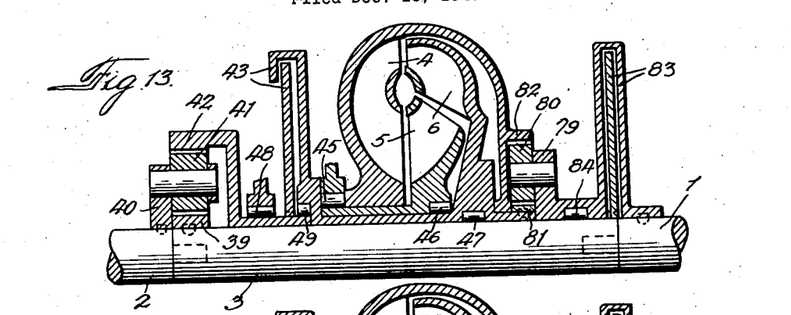
Figure 14:
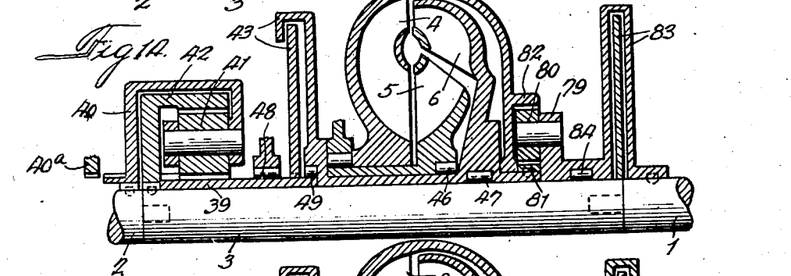

For this purpose, in Figs. 13 and 14, a front planetary gear construction is provided comprising a gear carrier 79 connected to rotate with the drive shaft 1, planet gears 80 mounted on this gear carrier 79, a sun gear 81 meshing with the planet gears rotatable in unison with the turbine rotor 6, and a ring gear 82 meshing with the planet gears 80 and rotatable in unison with the pump rotor 4. A clutch 83 is provided for connecting and disconnecting the shaft 3 with respect to the shaft 1. A one-way clutch 84 is provided for preventing the shaft 3 from overrunning the shaft 1.

In Fig. 13, for low speed range, both clutches 43 and 83 are disconnected, providing two power flow paths. The fluid power flow path is from the gear carrier 79 through the planet gears 80, ring gear 82, pump rotor 4, stator 5, turbine rotor 6, one-way clutch 47, shaft 3, sun gear 39, planet gears 41, and cage 40 to the driven shaft 2, the ring gear 42 being held against rotation by the one-way anchorage 48. The nonfluid power flow path is from the gear carrier 79 through the planet gears 80, sun gear 81, turbine hub, one-way clutch 47, shaft 3, sun gear 39, planet gears 41, and gear carrier 40 to the driven shaft 2.

With the construction shown in Fig. 13, assuming that the torque converter per se will give a torque increase of 3:1 and that in both planetaries the ratio of sun gear diameter to ring gear diameter is 2:3, with the transmission in low—that is, with both clutches 43 and 83 disconnected—a torque range of from about 5.5:1 to about 2.5:1 may be obtained, approximately 60 per cent of the power flow being through the fluid transmission, the other 40 per cent being bypassed.

For the intermediate speed range, the clutch 43 is connected, the clutch 83 remaining disconnected. Under these conditions, the ring gear 42 rotates in unison with the turbine rotor 6 and the sun gear 39 also rotates in unison with the turbine rotor 6 so that the rear planetary unit 39, 40, 41, and 42 rotates as a unit. The power flow is still divided, one path being from the gear carrier 79 through the planet gears 80, ring gear 82, pump rotor 4, and stator 5 to the turbine rotor 6, and the other path being from the gear carrier 79 through the planet gears 80 and sun gear 81 to the turbine rotor 6. Under these conditions, a torque range of from 2.2:1 up to 1:1 may be obtained, 60 per cent of the power flow being through the fluid torque converter. For high gear, both clutches 43 and 83 are connected. Under these conditions, there are three power flow paths between the shafts 1 and 2. One power flow path is from the shaft 1, 2, through the clutch, shaft 3, sun gear 39, planet gears 41 and gear carrier 40 to the shaft 2. Another path is from the gear carrier 79 through the planet gears 80, ring gear 82, pump rotor 4, stator 5, turbine rotor 6, clutch 43, ring gear 42, planet gears 41 and gear carrier 40 to the shaft 2. The third path is from the gear carrier 79 through the planet gears 80, sun gear 81, turbine hub, clutch 43, ring gear 42, planet gears 41, and gear carrier 40 to the driven shaft 2. Under these conditions, a torque range of from 1.5:1 to substantially direct is obtained, 36 per cent of the power flow being through the fluid torque converter. This will give an overall efficiency of approximately 93 per cent, even if the fluid part of the transmission is operating only at 80 per cent efficiency.

The construction of Fig. 14 is similar to that of Fig. 13 so far as the front clutch and front planetary construction are concerned. The rear planetary of Fig. 14 differs from the rear planetary of Fig. 13 in that the relations of the gears 39 and 42 are reversed. In Fig. 14, the sun gear 39, instead of being keyed to the shaft 3, is connectible and disconnectible with the turbine rotor 6 by means of the clutch 43. The ring gear 42, instead of being controlled by the clutch 43, as in Fig. 13, is keyed to the shaft 3. The operation is similar to the operation described in connection with Fig. 13, though different torque and efficiency values are obtained. With the construction of Fig. 14, in low gear, the torque range will be from about 3.7:1 to about 1.6:1, 60 per cent of the power flow being through the hydraulic part of the transmission. In the intermediate range, with the rear clutch 43 connected and the front clutch 83 disconnected, the torque range will be from approximately 2.2:1 to practically 1:1, 60 per cent of the power flow still being through the fluid part of the transmission. In the high range, with both clutches connected, the speed ratio range will be from about 1.3:1 to practically direct, only 24 per cent of the power flow being through the fluid part of the transmission. Under these conditions, the overall efficiency will be approximately 95 per cent, even if the efficiency of the fluid part of the transmission drops to 80 per cent.

Figure 15:
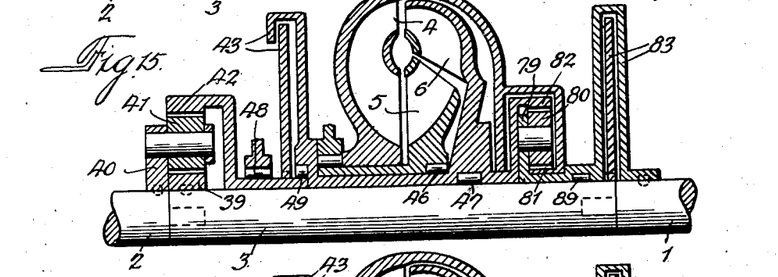

The construction of Fig. 15 is similar to that of Fig. 13, except that the relations of the sun gear 81 and ring gear 82 to the other parts of the transmission are reversed. In Fig. 15, the ring gear 82, instead of being connected to the pump rotor 4, is connected to rotate with the turbine rotor 6 and the sun gear 81, instead of being connected to rotate with the turbine rotor 6, is connected to rotate with the pump rotor 4. The operation is in general the same as that described in connection with Fig. 13. In this form, in the low speed range, with both clutches 43 and 83 disconnected, the speed ratio range varies from 4.5:1 to 2.5:1, 40 per cent of the power flow being through the fluid torque converter. In the intermediate range, with the rear clutch 43 connected, the speed ratio range varies from 1.8:1 to practically 1:1, 40 per cent of the power flow being through the fluid torque converter. In the high range, with both clutches 43 and 83 connected, the speed ratio range is from 1.35:1 to substantially 1:1, 24 per cent of the power flow being through the fluid torque converter. Under these conditions the overall efficiency will approximate 95 per cent, even if the efficiency of the fluid part of the transmission drops to 80 per cent.

Figure 16:
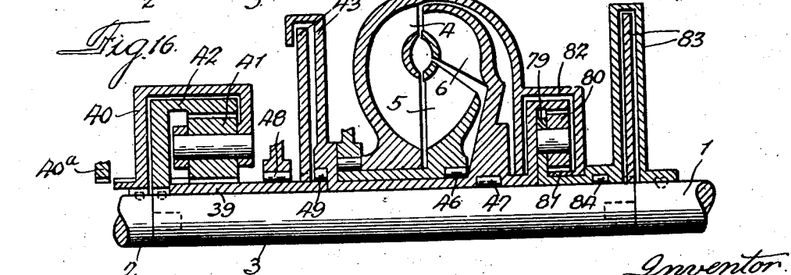

The construction shown in Fig. 16 is similar to that shown in Fig. 15, except that the relations of the gears 39 and 42 are reversed. In Fig. 16, the sun gear 39, instead of being keyed to the shaft 3, is connectible and disconnectible with respect to the turbine rotor 6 by means of the clutch 43, and the ring gear 42, instead of being controlled by the clutch 43, as in Fig. 15, is keyed to the shaft 3. The operation is similar to the operation described in connection with Fig. 15, although different torque and efficiency values are obtained. With the construction of Fig. 16, in the low speed range, when both clutches are disconnected, the speed ratio range varies from 3:1 to 1.66:1, 40 per cent of the power flow being through the fluid torque converter. In the intermediate stage, with the clutch 43 connected and the clutch 83 disconnected, the speed ratio range varies from 1.8:1 to substantially 1:1, 40 per cent of the power flow being through the fluid torque converter. In high gear, when both clutches 43 and 83 are connected, the speed ratio range will be from 1.2:1 to substantially direct drive, 16 per cent of the power flow being through the fluid torque converter. Under these conditions, the overall efficiency will be approximately 97 per cent even if the efficiency of the fluid part of the transmission drops to 80 per cent.

In the construction of Figs. 14 and 16, a reverse may be obtained by means of a stationary clutch ring 40a cooperating with the gear carrier 40 in the manner described in connection with Fig. 8.

By proper choice of the relative diameters of ring gear and sun gear and a proper selection from the types of transmission shown in Figs. 13-16, incl., a wide variety of transmissions may be obtained, varying in torque ratios, speed ranges, and overall efficiency.

Further modifications will be apparent to those skilled in the art and it is desired, therefore, that the invention be limited only by the scope of the appended claims.

Having thus described my invention, what I claim and desire to secure by Letters Patent is:

1. A turbo-planetary transmission comprising a drive shaft, a driven shaft, a pump rotor, a reactance stator, a turbine rotor, a gear carrier connected to rotate with the drive shaft, planet gearing mounted on said gear carrier, two coaxial gears meshing with said planet gearing, one of said gears and said turbine rotor being connected to rotate in unison with the driven shaft, clutch means for connecting and disconnecting said pump rotor with respect to the other of said gears, and clutch means for connecting and disconnecting said pump rotor with respect to said gear carrier.

2. A turbo-planetary transmission comprising a drive shaft, a driven shaft, a pump rotor, a reactance stator, a turbine rotor, a gear carrier connected to rotate with the drive shaft, planet gearing mounted on said gear carrier, two coaxial gears meshing with said planet gearing, one of said gears and said turbine rotor being connected to rotate in unison with the driven shaft, clutch means for connecting and disconnecting said pump rotor with respect to the other of said gears, clutch means for connecting and disconnecting said pump rotor with respect to said gear carrier, and anchorage means for holding said other of said gears against rotation in the direction of rotation of said gear carrier to effect overdrive of said one of said gears.

3. A turbo-planetary transmission comprising a drive shaft, a driven shaft, a pump rotor, a reactance stator, a turbine rotor, a gear carrier connected to rotate with the drive shaft, planet gearing mounted on said gear carrier, a sun gear meshing with said planet gearing, a ring gear mounted with said planet gearing, said ring gear and said turbine rotor being connected to rotate in unison with the driven shaft, clutch means for connecting and disconnecting said pump rotor with respect to said sun gear, and clutch means for connecting and disconnecting said pump rotor with respect to said gear carrier.

4. A turbo-planetary transmission comprising a drive shaft, a driven shaft, a pump rotor, a reactance stator, a turbine rotor, a gear carrier connected to rotate with the drive shaft, planet gearing mounted on said gear carrier, a sun gear meshing with said planet gearing, a ring gear meshing with said planet gearing, said ring gear and said turbine rotor being connected to rotate in unison with the driven shaft, clutch means for connecting and disconnecting said pump rotor with respect to said sun gear, clutch means for connecting and disconnecting said pump rotor with respect to said gear carrier, and anchorage means for holding said sun gear against rotation in the direction of rotation of said gear carrier to effect overdrive of said ring gear.

5. A turbo-planetary transmission comprising a drive shaft, a driven shaft, a pump rotor, a one-way rotatable reactance stator, a turbine rotor, a gear carrier connected to rotate with the drive shaft, planet gearing mounted on said gear carrier, two coaxial gears meshing with said planet gearing, one of said gears and said turbine rotor being connected to rotate in unison with the driven shaft, clutch means for connecting and disconnecting said pump rotor with respect to the other of said gears, clutch means for connecting and disconnecting said pump rotor with respect to said gear carrier, a second gear carrier rotatable with said driven shaft, planet gearing mounted on said second gear carrier, two coaxial gears meshing with said planet gearing, one of said last said coaxial gears being rotatable with said one-way rotatable stator, and a third shaft rotatable with the other of said last said coaxial gears.

6. A turbo-planetary transmission comprising a drive shaft, a driven shaft, a pump rotor, a one-way rotatable reactance stator, a turbine rotor, a gear carrier connected to rotate with the drive shaft, planet gearing mounted on said gear carrier, two coaxial gears meshing with said planet gearing, one of said gears and said turbine rotor being connected to rotate in unison with the driven shaft, clutch means for connecting and disconnecting said pump rotor with respect to the other of said gears, clutch means for connecting and disconnecting said pump rotor with respect to said gear carrier, a second gear carrier rotatable with said driven shaft, planet gearing mounted on said second gear carrier, two coaxial gears meshing with said planet gearing, means for connecting and disconnecting one of said last said coaxial gears with respect to said one-way rotatable stator, a third shaft rotatable with the other of said last said coaxial gears, and anchorage means for holding said one of said last said gears against rotation in the direction of rotation of said gear carrier.

7. A turbo-planetary transmission comprising a drive shaft, a driven shaft, an intermediate shaft, a pump rotor driven from said drive shaft, a reactance stator, a turbine rotor, a gear carrier connected to rotate with the driven shaft, planet gearing mounted on said gear carrier, two coaxial gears meshing with said planet gearing, one of said gears being connected to rotate with said intermediate shaft, said turbine rotor being connected to rotate with the other of said gears, clutch means for connecting and disconnecting said turbine rotor with respect to said intermediate shaft, and clutch means for connecting and disconnecting said drive shaft with respect to said intermediate shaft.

8. A turbo-planetary transmission comprising a drive shaft, a driven shaft, an intermediate shaft, a pump rotor driven from said drive shaft, a reactance stator, a turbine rotor, a gear carrier connected to rotate with the driven shaft, planet gearing mounted on said gear carrier, two coaxial gears meshing with said planet gearing, one of said gears being connected to rotate with said intermediate shaft, means for connecting and disconnecting said turbine rotor with respect to the other of said gears, one-way anchorage means for preventing reverse rotation of said other of said gears as said one of said gears rotates, clutch means for connecting and disconnecting said turbine rotor with respect to said intermediate shaft, and clutch means for connecting and disconnecting said drive shaft with respect to said intermediate shaft.

9. A hydro planetary transmission comprising a drive shaft, a driven shaft, and an intermediate shaft, said shafts being coaxial, a pump rotor driven from said drive shaft, a turbine rotor, a reactance stator acting between said pump rotor and turbine rotor, a gear carrier connected to rotate in unison with said driven shaft, planet gearing mounted on said gear carrier, two coaxial gears meshing with said planet gearing, one of said coaxial gears being connected to rotate in unison with said intermediate shaft, the other of said gears being connected to rotate in unison with the turbine rotor, one-way coupling means for preventing the turbine rotor from overrunning the intermediate shaft, and means for connecting and disconnecting the intermediate shaft with respect to the drive shaft.

10. A hydro planetary transmission comprising a drive shaft, a gear carrier connected to rotate in unison therewith, planet gearing mounted on said gear carrier, two coaxial gears meshing with said planet gearing, a pump rotor connected to rotate in unison with one of said two gears, a turbine rotor rotatable in unison with the other of said gears, a reactance stator acting between said rotors, a driven shaft, a second gear carrier connected to rotate with said driven shaft, planet gearing mounted on said gear carrier, two coaxial gears meshing with said planet gearing, one-way coupling means for preventing reverse rotation of one of said last two gears as the other of said last two gears rotates, coupling means for connecting and disconnecting said one of said last two gears with respect to the turbine rotor and its associated gear, clutch means for connecting and disconnecting the other of the last said two gears with respect to the drive shaft, and one-way coupling means for preventing the turbine rotor from overrunning said other of the last said two gears.

11. A turbo-planetary transmission comprising a drive shaft, a driven shaft, a pump rotor, a reactance stator, a turbine rotor, a gear carrier connected to rotate with the drive shaft, planet gearing mounted on said gear carrier, two coaxial gears meshing with said planet gearing, one of said gears and said turbine rotor being connected to rotate with the driven shaft, clutch means for connecting and disconnecting said pump rotor with respect to the other of said gears, and clutch means for connecting and disconnecting said pump rotor with respect to said drive shaft.

12. A turbo-planetary transmission comprising a drive shaft, a driven shaft, a pump rotor, a reactance stator, a turbine rotor, a gear carrier connected to rotate with the drive shaft, planet gearing mounted on said gear carrier, two coaxial gears meshing with said planet gearing, said turbine rotor being connected to rotate with the driven shaft, and means including rotation-controlling instrumentalities for changing the speed ratio condition between the drive shaft and driven shaft comprising means by which in one condition the pump rotor is connected to rotate in unison with the drive shaft and is supplied with power therefrom and the two gears are disconnected from driving relation with respect to the driven shaft and by which in another condition the pump rotor is not connected to rotate in unison with the drive shaft and is rotatable in unison with and supplied with power from one of said gears and the driven shaft is rotatable in unison with and supplied with power from the other of said gears as well as from said turbine rotor.

13. A turbo-planetary transmission comprising a drive shaft, a driven shaft, a pump rotor, a reactance stator, a turbine rotor, a gear carrier connected to rotate with the drive shaft, planet gearing mounted on said gear carrier, a sun gear and a ring gear meshing with said planet gearing, said turbine rotor being connected to rotate with the driven shaft, and means including rotation-controlling instrumentalities for changing the speed ratio condition between the drive shaft and driven shaft comprising means by which in one condition the pump rotor is connected to rotate in unison with the drive shaft and is supplied with power therefrom and the two gears are disconnected from driving relation with respect to the driven shaft and by which in another condition the pump rotor is not connected to rotate in unison with the drive shaft and is rotatable in unison with and supplied with power from said ring gear and the driven shaft is rotatable in unison with and suplied with power from said sun gear as well as from said turbine rotor.

14. A turbo-planetary transmission comprising a drive shaft, a driven shaft, a pump rotor, a reactance stator, a turbine rotor, a gear carrier connected to rotate with the drive shaft, planet gearing mounted on said gear carrier, two coaxial gears meshing with said planet gearing, said turbine rotor being connected to rotate with the driven shaft, and means including rotation-controlling instrumentalities for changing the speed ratio condition between the drive shaft and driven shaft comprising means by which in one condition all the power from the drive shaft to the driven shaft is through the pump rotor, reactance stator and turbine rotor, and by which in another condition one of the gears is connected to rotate in unison with the pump rotor and supplies power thereto and the other gear is connected to rotate in unison with the driven shaft and supplies power thereto in addition to power supplied thereto by said turbine rotor.

15. A turbo-planetary transmission comprising a drive shaft, a driven shaft, a pump rotor, a reactance stator, a turbine rotor, a gear carrier connected to rotate with the drive shaft, planet gearing mounted on said gear carrier, a sun gear and a ring gear meshing with said planet gearing, said turbine rotor being connected to rotate with the driven shaft, and means including rotation-controlling instrumentalities for changing the speed ratio condition between the drive shaft and driven shaft comprising means by which in one condition all the power from the drive shaft to the driven shaft is through the pump rotor, reactance stator and turbine rotor and by which in another condition the ring gear is connected to rotate in unison with the pump rotor and supplies power thereto and the sun gear is connected to rotate in unison with the driven shaft and supplies power thereto in addition to power supplied thereto by said turbine rotor.

WILLARD L. POLLARD.